United States Patent
Ogasawara et al.

(10) Patent No.: US 11,392,540 B2
(45) Date of Patent: Jul. 19, 2022

(54) COMPUTER SYSTEM AND DATA ACCESS CONTROL METHOD

(71) Applicant: Hitachi, Ltd., Tokyo (JP)

(72) Inventors: Shinji Ogasawara, Tokyo (JP); Koji Honami, Tokyo (JP); Takeshi Kitamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/015,526

(22) Filed: Sep. 9, 2020

(65) Prior Publication Data

US 2021/0191901 A1    Jun. 24, 2021

(30) Foreign Application Priority Data

Dec. 18, 2019    (JP) .............................. JP2019-228675

(51) Int. Cl.
  *G06F 16/11*    (2019.01)
  *G06F 16/178*   (2019.01)
  *G06F 16/176*   (2019.01)

(52) U.S. Cl.
  CPC .......... *G06F 16/119* (2019.01); *G06F 16/176* (2019.01); *G06F 16/178* (2019.01)

(58) Field of Classification Search
  None
  See application file for complete search history.

(56) References Cited

U.S. PATENT DOCUMENTS

| | | | |
|---|---|---|---|
| 2006/0129537 A1* | 6/2006 | Torii | G06F 16/185 |
| 2012/0016838 A1* | 1/2012 | Arai | G06F 16/1844 |
| | | | 707/610 |
| 2018/0060313 A1* | 3/2018 | Buehne | G06F 16/214 |

FOREIGN PATENT DOCUMENTS

WO    2011/148496 A1    12/2011

* cited by examiner

*Primary Examiner* — Hosain T Alam
*Assistant Examiner* — Anthony G Gemignani
(74) *Attorney, Agent, or Firm* — Mattingly & Malur, PC

(57) ABSTRACT

A computer system is coupled to a local storage system and a remote storage system, and comprises a data mover, and a recall size analysis unit. The recall size analysis unit uses a combination of type of the data and size of the data as a retrieval key of an access characteristics to analyze the logs of the same access characteristics and to determine a recall size for each of the access characteristics. The data mover obtains a target data corresponding to the recall size of the access characteristics of the target data from the remote storage system in a case of receiving a read request for the target data that is not stored in the local storage system.

2 Claims, 12 Drawing Sheets

| TIME STAMP | TYPE ID | SIZE | FILE PATH LENGTH | ABSOLUTE FILE PATH | OFFSET | READ SIZE |
|---|---|---|---|---|---|---|
| 2019/10/01 10:10:00 | app1 | 2Mbyte | 40 | /mnt/.../fileA.pst | 0Kbyte | 256Kbyte |
| 2019/10/01 10:10:01 | app1 | 2Mbyte | 88 | /A/.../fileA.pst | 0Kbyte | 1024Kbyte |
| 2019/10/01 10:10:05 | app1 | 2Mbyte | 40 | /mnt/.../fileA.pst | 256Kbyte | 256Kbyte |
| 2019/10/01 10:10:15 | app1 | 2Mbyte | 40 | /mnt/.../fileA.pst | 512Kbyte | 256Kbyte |
| 2019/10/01 10:11:00 | app1 | 3Mbyte | 38 | /mnt/.../fileB.pst | 0Kbyte | 128Kbyte |
| 2019/10/01 10:11:01 | app1 | 3Mbyte | 75 | /A/.../fileB.pst | 0Kbyte | 1024Kbyte |
| 2019/10/01 10:11:05 | app1 | 3Mbyte | 38 | /mnt/.../fileB.pst | 128Kbyte | 128Kbyte |
| 2019/10/01 10:12:00 | app1 | 2Mbyte | 40 | /mnt/.../fileA.pst | 768Kbyte | 256Kbyte |
| 2019/10/01 10:12:01 | app1 | 2Mbyte | 40 | /mnt/.../fileA.pst | 1024Kbyte | 256Kbyte |
| 2019/10/01 10:12:01 | app1 | 2Mbyte | 88 | /A/.../fileA.pst | 1024Kbyte | 1024Kbyte |
| 2019/10/01 10:12:05 | app1 | 2Mbyte | 40 | /mnt/.../fileA.pst | 1280Kbyte | 256Kbyte |
| 2019/10/01 10:12:10 | app1 | 2Mbyte | 40 | /mnt/.../fileA.pst | 1536Kbyte | 256Kbyte |
| 2019/10/01 10:12:30 | app1 | 2Mbyte | 40 | /mnt/.../fileA.pst | - | - |
| 2019/10/01 10:13:00 | app1 | 3Mbyte | 38 | /mnt/.../fileB.pst | - | - |

FIG. 4

| 601 | 602 | 603 | 604 | 605 | 606 207 |
|---|---|---|---|---|---|
| FILE SIZE RANGE ID | TYPE ID | CACHE-HIT DATA AMOUNT | CACHE-MISS DATA AMOUNT | OVER-CACHE DATA AMOUNT | RECALL SIZE |
| A | app1 | 1408 Kbyte | 640Kbyte | 1024Kbyte | 1024Kbyte |
| ... | ... | ... | ... | ... | ... |

FIG. 6

| TIME STAMP 401 | TYPE ID 402 | SIZE 403 | FILE PATH LENGTH 404 | ABSOLUTE FILE PATH 405 | OFFSET 406 | READ SIZE 407 |
|---|---|---|---|---|---|---|
| 2019/10/01 10:10:00 | app1 | 2Mbyte | 40 | /mnt/.../fileA.pst | 0Kbyte | 256Kbyte |
| 2019/10/01 10:10:01 | app1 | 2Mbyte | 88 | /A/.../fileA.pst | 0Kbyte | 896Kbyte |
| 2019/10/01 10:10:05 | app1 | 2Mbyte | 40 | /mnt/.../fileA.pst | 256Kbyte | 256Kbyte |
| 2019/10/01 10:10:15 | app1 | 2Mbyte | 40 | /mnt/.../fileA.pst | 512Kbyte | 256Kbyte |
| 2019/10/01 10:11:00 | app1 | 3Mbyte | 38 | /mnt/.../fileB.pst | 0Kbyte | 128Kbyte |
| 2019/10/01 10:11:01 | app1 | 3Mbyte | 75 | /A/.../fileB.pst | 0Kbyte | 896Kbyte |
| 2019/10/01 10:11:05 | app1 | 3Mbyte | 38 | /mnt/.../fileB.pst | 128Kbyte | 128Kbyte |
| 2019/10/01 10:12:00 | app1 | 2Mbyte | 40 | /mnt/.../fileA.pst | 768Kbyte | 256Kbyte |
| 2019/10/01 10:12:01 | app1 | 2Mbyte | 88 | /A/.../fileA.pst | 896Kbyte | 896Kbyte |
| 2019/10/01 10:12:01 | app1 | 2Mbyte | 40 | /mnt/.../fileA.pst | 1024Kbyte | 256Kbyte |
| 2019/10/01 10:12:05 | app1 | 2Mbyte | 40 | /mnt/.../fileA.pst | 1280Kbyte | 256Kbyte |
| 2019/10/01 10:12:10 | app1 | 2Mbyte | 40 | /mnt/.../fileA.pst | 1536Kbyte | 256Kbyte |
| 2019/10/01 10:12:30 | app1 | 2Mbyte | 40 | /mnt/.../fileA.pst | - | - |
| 2019/10/01 10:13:00 | app1 | 3Mbyte | 38 | /mnt/.../fileB.pst | - | - |

COMPUTER SYSTEM AND DATA ACCESS CONTROL METHOD

CLAIM OF PRIORITY

The present application claims priority from Japanese patent application JP 2019-228675 filed on Dec. 18, 2019, the content of which is hereby incorporated by reference into this application.

BACKGROUND OF THE INVENTION

The present invention relates to migration of session information held by a communication server.

A management method of replicating data from a file server to a storage system (a remote storage system) on a cloud and deleting a file entity from the file server has been used from the viewpoint of capacity management of file servers. In the management method, the file server obtains data from a remote storage system in an on-demand manner in a case where an access to a file of which the entity is present only in the remote storage system is received from an end user.

A technique disclosed in International Patent Publication No. 2011/148496 is known as a method of determining a file server and a remote storage system, in which data is to be stored.

International Patent Publication No. 2011/148496 discloses "a local file server, which manages a local storage device, and a remote file server, which manages a remote storage device, are connected to a communication network (for example, Internet). The local file server: (A) makes and transfers a replica of a file stored in the local storage device to the remote file server for a replication; and (B), if a first condition is satisfied, manages, as a to-be-migrated file, the file the replica of which has been transferred for the replication. Even after the completion of (B), the local file server does not delete the to-be-migrated file from the local storage device but, if a second condition is satisfied, deletes the to-be-migrated file from the local storage device."

When the management method disclosed in International Patent Publication No. 2011/148496 is used, data which is not referred to or of which the reference frequency is low is stored in an inexpensive remote storage system that has a large capacity and is inexpensive, and data of which the reference frequency is high is stored in a file server.

SUMMARY OF THE INVENTION

Access to data depends greatly on an accessing application. For example, there are applications that obtain entire file data and applications that obtain only a portion of a file and execute processing.

In a case where an application reads data from a file server via a file sharing protocol such as a common Internet file system (CIFS) and a network file system (NFS), it may be unable to transfer data efficiently due to a gap in a unit of data transfer between units of the file sharing protocol and a data transfer protocol between the file server and the remote storage system.

For example, in a case where an application accesses a file server via an NFS, data is generally transferred in relatively small units of 64 Kbytes or the like. However, in a case where a file server requests data with respect to a remote storage system in units of 64 Kbytes, data is not always transferred efficiently. For example, in the case of an application that obtains an entire file, data may be transferred more efficiently when a file server obtains an entire file by sending one request to a remote storage system.

However, since the capacity of a file server is smaller than the capacity of a remote storage system, reading a file having a large volume may impose a burden on the capacity of the file server. Moreover, reading a file having a large volume may impose a burden on a communication band.

The present invention provides a technique of controlling a read amount of files (data) from a remote storage system so that the performance of accessing files (data) is maintained and the problem of a burden imposed on a communication band and the capacity of a file server is avoided.

A representative example of the present invention disclosed in this specification is as follows: a computer system comprises at least one computer and managing data. The at least one computer including an arithmetic device, a storage device coupled to the arithmetic device, and a connection interface coupled to the arithmetic device. The computer system is coupled to a local storage system and a remote storage system. The computer system comprises: a control unit configured to execute writing and reading of the data to and from a terminal coupled to the computer system; a data mover configured to execute writing and reading of the data to and from the local storage system and the remote storage system; a log obtaining unit configured to obtain logs related to the reading of the data; and a recall size analysis unit configured to determine a recall size indicating a read amount of the data from the remote storage system. The recall size analysis unit is configured to use a combination of type of the data and size of the data as a retrieval key of an access characteristics to analyze the logs of the same access characteristics and to determine the recall size for each of the access characteristics. The data mover is configured to: store the data stored in the local storage system in the remote storage system; execute a stubification process that deletes the data from the local storage system, the data is stored in the local storage system and the remote storage system and satisfies prescribed conditions, and stores management information for accessing the data stored in the remote storage system in the local storage system; and obtain a target data corresponding to the recall size of the access characteristics of the target data from the remote storage system using the management information on the target data in a case of receiving a read request for the target data that is not stored in the local storage system.

According to the present invention, by determining a recall size for respective access characteristics, it is possible to maintain the performance of accessing data and avoid the problem of a burden imposed on a communication band and the capacity of a computer (a file server). Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 4 is a diagram illustrating an example of a data structure of read log information according to Embodiment 1;

FIG. 6 is a diagram illustrating an example of a data structure of analysis information according to Embodiment 1;

FIG. 13 is a diagram illustrating an example of a data structure of the read log information according to Embodiment 1.

DETAILED DESCRIPTION OF THE EMBODIMENT

Figure 1:
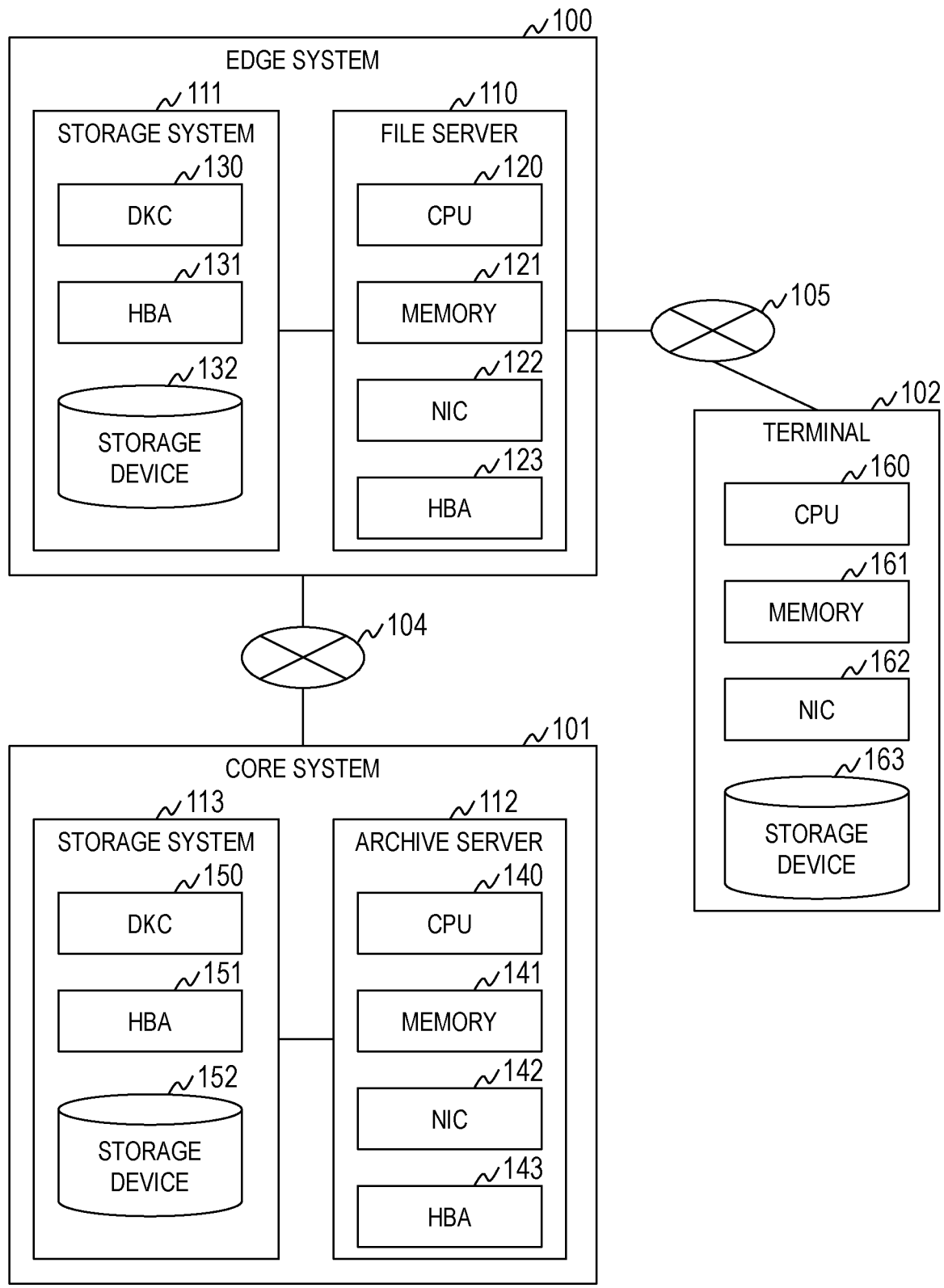
FIG. 1 is a diagram illustrating an example of a configuration of a computer system according to Embodiment 1.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

Embodiment 1

Figure 2:
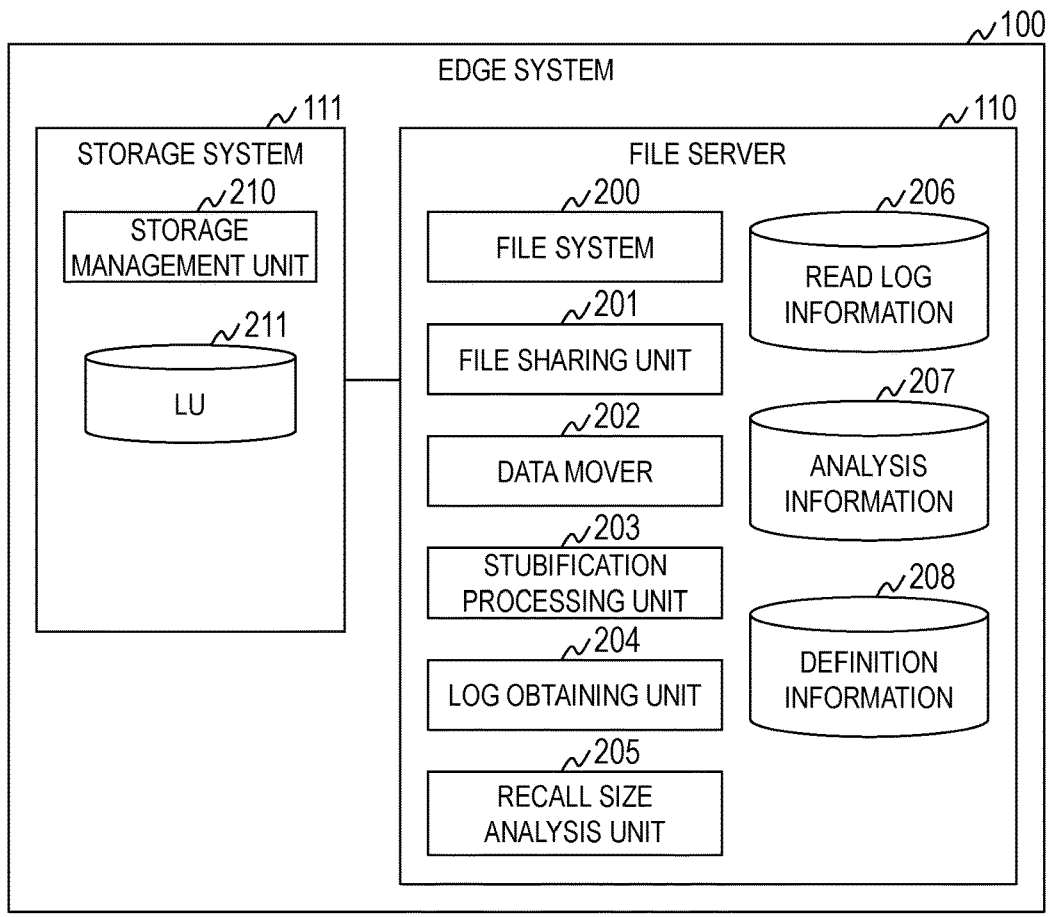
FIG. 2 is a diagram illustrating an example of a functional configuration of an edge system according to Embodiment 1.
Figure 3:
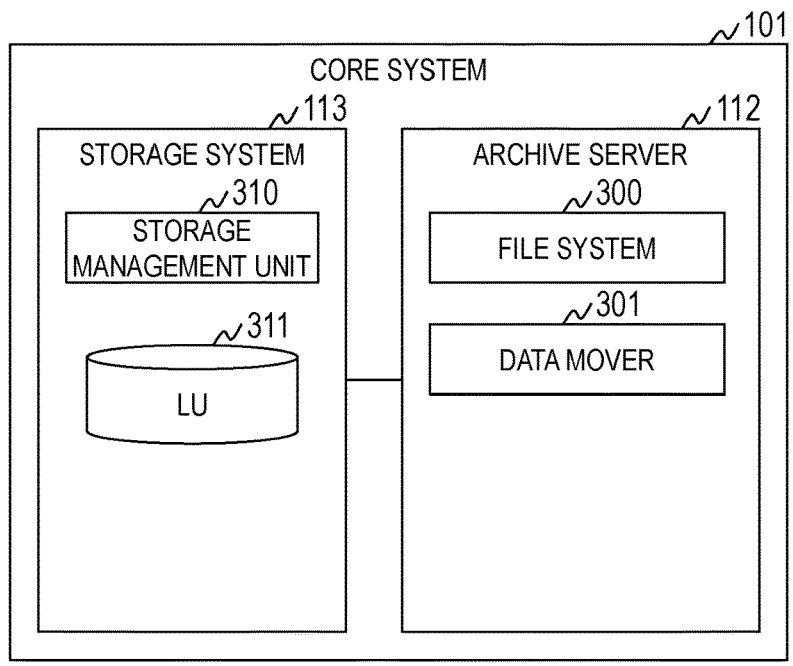
FIG. 3 is a diagram illustrating an example of a functional configuration of a core system according to Embodiment 1.

FIG. 1 is a diagram illustrating an example of a configuration of a computer system according to Embodiment 1. FIG. 2 is a diagram illustrating an example of a functional configuration of an edge system 100 according to Embodiment 1. FIG. 3 is a diagram illustrating an example of a functional configuration of a core system 101 according to Embodiment 1.

The computer system includes the edge system 100, the core system 101, and a terminal 102. The edge system 100 and the core system 101 are connected via a network 104, and the edge system 100 and the terminal 102 are connected via a network 105. The networks 104 and 105 are the Internet, a wide area network (WAN), and a local area network (LAN), for example. A connection method of the networks 104 and 105 may be a wired or wireless.

The numbers of edge systems 100, core systems 101, and terminals 102 included in the computer system may be two or more.

The edge system 100 is a system that provides a data (file) sharing function. The terminal 102 is a computer operated by a user who uses the edge system 100. The core system 101 is a system that provides a base for storing a large amount of data. The core system 101 is a system that realizes object storage, for example.

The edge system 100 includes a file server 110 and a storage system 111. The file server 110 and the storage system 111 are connected directly or via a network. The network is a LAN or a storage area network (SAN), for example.

Switches, gateways, and the like may be included in the edge system 100. The numbers of file servers 110 and storage systems 111 may be two or more.

The storage system 111 functions as a local storage system with a fast access speed. The storage system 111 includes a disk controller (DKC) 130, a host bus adapter (HBA) 131, and a plurality of storage devices 132. The respective hardware components are connected to each other via a bus (not illustrated).

The DKC 130 is a controller that controls the storage system 111. The DKC 130 includes a central processing unit (CPU) and a memory which are not illustrated. The HBA 131 is an interface for connecting to the file server 110. The storage device 132 is a hard disk drive (HDD), a solid state drive (SSD), and the like and permanently stores data.

A program that realizes a storage management unit 210 is stored in the memory of the DKC 130. Moreover, various pieces of management information are stored in the memory.

The storage management unit 210 manages a storage area of the storage system 111. The storage management unit 210 generates a logical unit (LU) 211 using the storage area of one or more storage devices 132 or the storage area of a redundant array of independent disks (RAID) group composed of a plurality of storage devices 132. The LU 211 may be realized using thin provisioning. The LU 211 is a storage area provided to the file server 110 and is used for storing files.

As for the functional unit included in the storage system 111, a plurality of functional units may be integrated into one functional unit, and one functional unit may be divided into a plurality of functional units for respective functions.

The file server 110 includes a CPU 120, a memory 121, a network interface card (NIC) 122, and a HBA 123. The respective hardware components are connected to each other via a bus (not illustrated).

The CPU 120 executes a program stored in the memory 121. The CPU 120 executes processing according to a program whereby the CPU 120 operates as a functional unit (module) that realizes a specific function. In the following description, when processing is described using a functional unit as a subject, it indicates that the CPU 120 executes a program that realizes the functional unit.

The NIC 122 is an interface for connecting to the core system 101 via the network 104 and connecting to the terminal 102 via the network 105. The HBA 123 is an interface for connecting to the storage system 111.

The memory 121 stores various pieces of information and a program executed by the CPU 120. The memory 121 includes a work area used by a program. As illustrated in FIG. 2, the memory 121 stores programs for realizing a file system 200, a file sharing unit 201, a data mover 202, a stubification processing unit 203, a log obtaining unit 204, and a recall size analysis unit 205. The memory 121 also stores read log information 206, analysis information 207, and definition information 208.

The read log information 206 is information for managing logs related to reading of files managed by the file server 110. The details of a data structure of the read log information 206 will be described with reference to FIG. 4. The analysis information 207 is information for managing results of analysis by using the read log information 206. The details of a data structure of the analysis information 207 will be described with reference to FIG. 6. The definition information 208 is information for managing a definition of identification information used for processing. The details of the data structure of the definition information 208 will be described with reference to FIG. 5.

The file system 200 manages files using file management information such as Mode management information.

The file sharing unit 201 provides a file sharing service using a protocol such as CIFS and NFS.

The data mover 202 controls transfer of data between the edge system 100 and the core system 101. Specifically, in a case where an execution trigger of replication is detected, the data mover 202 transmits the data of files to be stored in the LU 211 to the core system 101 for the replication. In a case where the data of a file corresponding to a read request is not present in the edge system 100, the data mover 202 obtains the data of the file from the core system 101. An example of the execution trigger of replication is reception of a data write request. The present invention is not limited to the timing at which replication is performed.

In the present specification, a file of which the entity is not present in the edge system 100 is referred to as a stub file. Moreover, reading the entity of a stub file from the core system 101 is referred to as recall.

It is assumed that the file management information of the present embodiment includes a flag indicating whether a file is a stub file.

The stubification processing unit 203 retrieves a subification target file and deletes the entity of the retrieved file from the edge system 100. In this case, the metadata of the file is not deleted but is stored in the edge system 100.

The log obtaining unit 204 obtains logs related to reading.

The recall size analysis unit 205 analyzes access characteristics of the recalled file and determines a read amount (recall size) of the file.

As for the functional unit of the file server 110, a plurality of functional units may be integrated into one functional unit, and one functional unit may be divided into a plurality of functional units for respective functions. A plurality of file servers 110 may be provided in the edge system 100, and processing may be performed by the respective file servers 110 in a distributed manner.

The core system 101 includes an archive server 112 and a storage system 113. The archive server 112 and the storage system 113 are connected directly or via a network. The network is a LAN or a storage area network (SAN), for example. The core system 101 is a system on the cloud, for example.

Switches, gateways, and the like may be included in the core system 101. The numbers of archive servers 112 and storage systems 113 may be two or more.

The storage system 113 functions as a remote storage system of which the access speed is slower than a local storage system. The storage system 113 includes a DKC 150, a HBA 151, and a plurality of storage devices 152. The respective hardware components are connected to each other via a bus (not illustrated).

The DKC 150, the HBA 151, and the storage device 152 are the same hardware components as the DKC 130, the HBA 131, and the storage device 132, respectively. The storage management unit 310 and the LU 311 included in the storage system 113 are the same as the storage management unit 210 and the LU 211, respectively.

As for the functional unit of the storage system 113, a plurality of functional units may be integrated into one functional unit, and one functional unit may be divided into a plurality of functional units for respective functions.

The archive server 112 includes a CPU 140, a memory 141, a NIC 142, and a HBA 143. The respective hardware components are connected to each other via a bus (not illustrated).

The CPU 140, the memory 141, the NIC 142, and the HBA 143 are the same hardware components as the CPU 120, the memory 121, the NIC 122, and the HBA 123.

The memory 141 stores programs for realizing the file system 300 and the data mover 301.

The file system 300 manages files using management information such as inode management information.

The data mover 301 controls transfer of data between the edge system 100 and the core system 101. Specifically, the data mover 301 receives the entity of a file from the edge system 100 and stores the file in the LU 311. The data mover 301 reads a file corresponding to a read request from the edge system 100 from the LU 311 and transmits the file to the edge system 100.

As for the functional unit of the archive server 112, a plurality of functional units may be integrated into one functional unit, and one functional unit may be divided into a plurality of functional units.

The terminal 102 includes a CPU 160, a memory 161, a NIC 162, and a storage device 163. The respective hardware components are connected to each other via a bus (not illustrated).

The CPU 160, the memory 161, and the NIC 162 are the same hardware components as the CPU 120, the memory 121, and the NIC 122, respectively. The storage device 163 is the same hardware component as the storage device 132.

An operating system (OS) and a program for realizing an application are stored in the memory 161.

FIG. 4 is a diagram illustrating an example of a data structure of the read log information 206 according to Embodiment 1.

The read log information 206 stores entries including a time stamp 401, a type ID 402, a size 403, a file path length 404, an absolute file path 405, an offset 406, and a read size 407. One entry is present for one log of processing.

The time stamp 401 is a field for storing the time point at which a read request was issued. The time stamp 401 is information for specifying the order of processing. The time point at which a read request was received may be stored in the time stamp 401.

The type ID 402 is a field for storing the identification information indicating the type of a read target file. A value defined in the definition information 208 is stored in the type ID 402.

The size 403 is a field for storing the size of an entire read target file.

The file path length 404 is a field for storing the length (a file path length) of a character string indicating a storage destination of a read target file.

The absolute file path 405 is a field for storing a character string (an absolute file path) indicating a storage destination of a read target file.

The offset 406 is a field for storing an offset indicating the starting point of a data read range within a read target file.

The read size 407 is a field for storing a read amount of data from a read target file.

Figure 5:
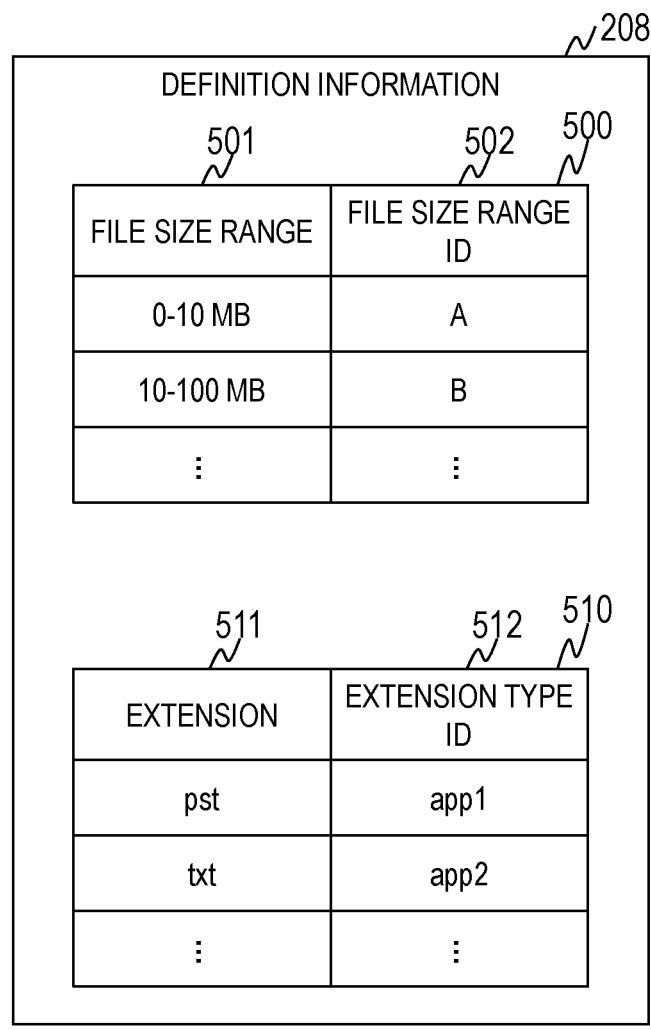
FIG. 5 is a diagram illustrating an example of a data structure of definition information according to Embodiment 1.

FIG. 5 is a diagram illustrating an example of a data structure of the definition information 208 according to Embodiment 1.

The definition information 208 includes file size range definition information 500 and extension definition information 510.

The file size range definition information 500 is information that defines the range of a file size and stores entries including a file size range 501 and a file size range ID 502. One entry is present for one range.

The file size range 501 is a field for storing the range of a file size. The file size range ID 502 is a field for storing the identification information of a range.

The extension definition information 510 is information that defines the type of a file and stores entries including an extension 511 and an extension type ID 512. One entry is present for one extension.

The extension 511 is a field for storing an extension indicating the type of a file. The extension type ID 512 is a field for storing the identification information of an extension.

FIG. 6 is a diagram illustrating an example of a data structure of the analysis information 207 according to Embodiment 1.

The analysis information 207 stores entries including a file size range ID 601, a type ID 602, a cache-hit data amount 603, a cache-miss data amount 604, an over-cache data amount 605, and a recall size 606.

One entry is present for a combination of range and type. In the present embodiment, a combination of range and type is handled as access characteristics of a file. This is because it is thought that read requests having the same file size and the same file type have similar access characteristics.

The file size range ID 601 is a field for storing the identification information defined in the file size range definition information 500.

The type ID 602 is a field for storing the identification information defined in the extension definition information 510.

The cache-hit data amount 603 is a field for storing a data amount (that is, the amount of cache-hit data) of read target data stored in the storage system 111 in a case where a read request is received.

The cache-miss data amount 604 is a field for storing a data amount (that is, the amount of cache-miss data) of read target data which is not stored in the storage system 111 in a case where a read request is received.

The over-cache data amount 605 is a field for storing a data amount of data which has been recalled to the file server 110 and which has been deleted without being referred to.

The recall size 606 is a field for storing a data amount of recalled files. A recall size presently set in the data mover 202 is stored in the recall size 606.

Figure 7:
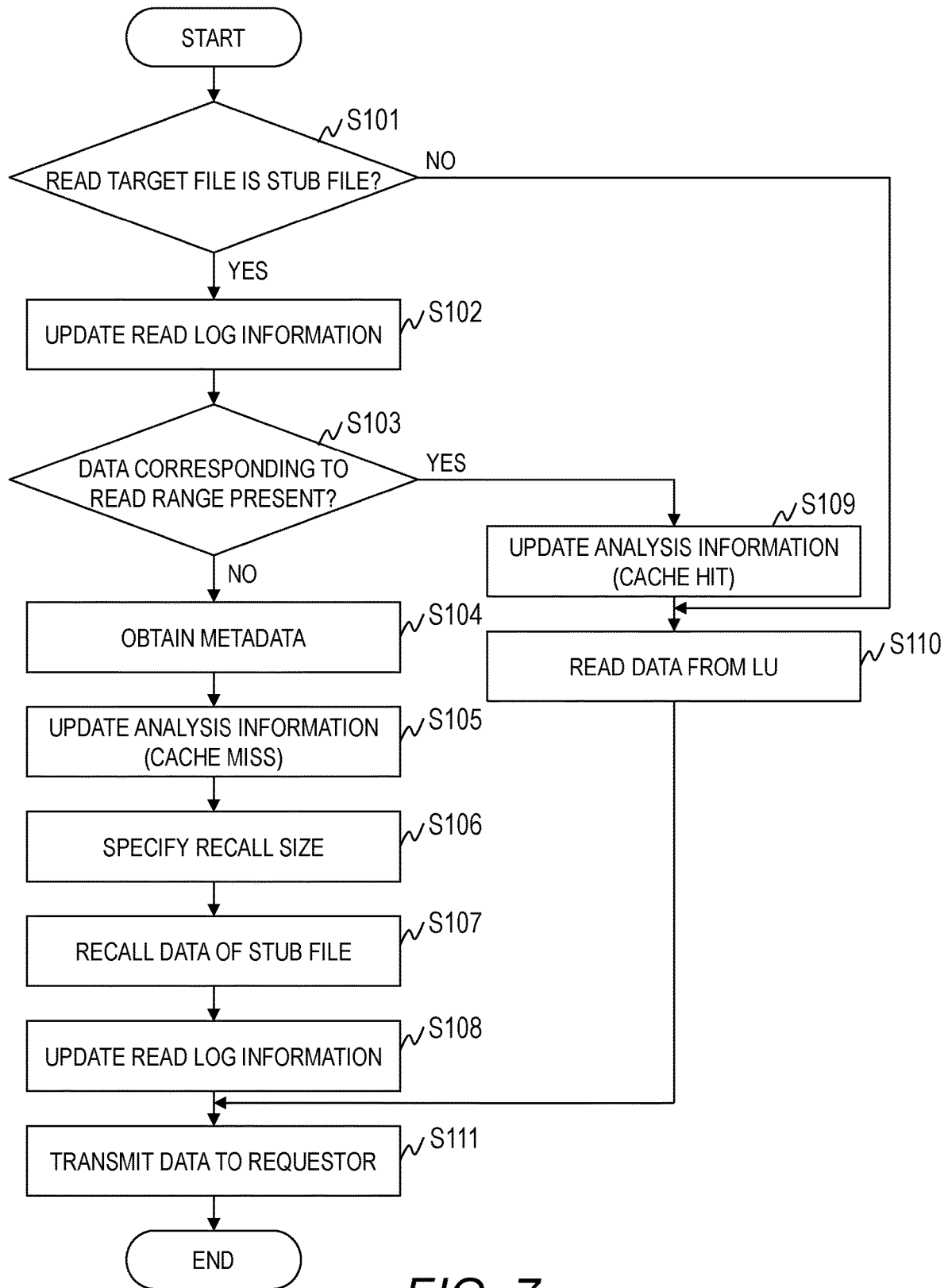
FIG. 7 is a flowchart for describing an example of processing executed in a case where a file server according to Embodiment 1 receives a read request.

FIG. 7 is a flowchart for describing an example of processing executed in a case where the file server 110 according to Embodiment 1 receives a read request.

The file sharing unit 201 of the file server 110 starts the following processing in a case where a read request is received from an application operating on the terminal 102. The read request includes the size of an entire read target file, the type (extension) of a file, a read amount of data, an offset, an absolute file path, and the like.

The file system 200 receives a read request via the file sharing unit 201 and determines whether the read target file is a stub file (step S101).

Specifically, the file system 200 refers to the management information on the file and determines whether a flag indicating that the read target file is a stub file is set.

In a case where it is determined that the read target file is not a stub file, the file system 200 reads data of the file from the LU 211 (step S110) and outputs the data to the file sharing unit 201.

The file sharing unit 201 transmits the data received from the file system 200 to an application (step S111).

In a case where it is determined in step S101 that the read target file is a stub file, the file system 200 instructs the log obtaining unit 204 to register the log of the read request (step S102).

Subsequently, the file system 200 determines whether the data of a read range designated in the read request is stored in the LU 211 (step S103).

In a case where the data of a partial range of the read range is stored in the LU 211, the file system 200 determines that the data of the read range is not stored in the LU 211.

In a case where the data of the read range designated in the read request is stored in the LU 211, the file system 200 updates the analysis information 207 by notifying the recall size analysis unit 205 of a cache hit (step S109) and the flow proceeds to step S110.

The recall size analysis unit 205 executes the following processing in a case of receiving the update instruction.

(S109-1) The recall size analysis unit 205 refers the extension definition information 510 of the definition information 208 to convert the extension included in the read request to the identification information of the extension. The recall size analysis unit 205 refers to the file size range definition information 500 of the definition information 208 to retrieve an entry corresponding to the file size range including the read range included in the read request and convert the read range to the identification information of a range.

(S109-2) The recall size analysis unit 205 refers to the analysis information 207 to retrieve an entry of which the file size range ID 601 and the type ID 602 match the identification information of the range and the identification information of the extension.

(S109-3) In a case where the entry is present, the recall size analysis unit 205 adds the read range to the cache-hit data amount 603 of the retrieved entry.

(S109-4) In a case where the entry is not present, the recall size analysis unit 205 adds an entry and sets the range identification information and the extension identification information to the file size range ID 601 and the type ID 602 of the added entry. Moreover, the recall size analysis unit 205 sets an initial value of "0" to the cache-hit data amount 603, the cache-miss data amount 604, and the over-cache data amount 605 of the added entry. The recall size analysis unit 205 sets an initial value to the recall size 606 of the added entry. The initial value of the recall size may be set arbitrarily. Furthermore, the recall size analysis unit 205 adds the read range to the cache-hit data amount 603 of the added entry. Hereinabove, the processing executed by the recall size analysis unit 205 has been described.

Subsequently, the file system 200 reads data of the file from the LU 211 (step S110) and outputs the data to the file sharing unit 201.

The file sharing unit 201 transmits the data received from the file system 200 to an application (step S111).

In a case where it is determined in step S103 that the data of the read range designated in the read request is not stored in the LU 211, the file system 200 obtains metadata of the stub file (step S104) and updates the analysis information 207 by notifying the recall size analysis unit 205 of a cache miss (step S105).

The recall size analysis unit 205 having received the update instruction executes the following processing.

(S105-1) The recall size analysis unit 205 converts the extension and the read range included in the read request to the identification information of the extension and the identification information of the range. Since a conversion method is the same as S109-1, the description thereof will be omitted.

(S105-2) The recall size analysis unit 205 refers to the analysis information 207 to retrieve an entry of which the file size range ID 601 and the type ID 602 match the identification information of the range and the identification information of the extension.

(S105-3) In a case where the entry is present, the recall size analysis unit 205 adds a range of absent data to the cache-miss data amount 604 of the retrieved entry.

(S105-4) In a case where the entry is not present, the recall size analysis unit 205 adds an entry and sets initial values to the respective fields of the added entry. An initial value setting method is the same as S109-4. The recall size analysis unit 205 adds the range of absent data to the cache-miss data amount 604 of the added entry. Hereinabove, the processing executed by the recall size analysis unit 205 has been described.

Subsequently, the file system 200 specifies a recall size by sending an inquiry to the recall size analysis unit 205 (step S106).

The recall size analysis unit 205 having received the inquiry executes the following processing. It is assumed that the inquiry includes the read range and the extension included in the read request.

(S106-1) The recall size analysis unit 205 converts the extension and the read range included in the inquiry to the identification information of the extension and the identification information of the range. Since a conversion method is the same as S107-1, the description thereof will be omitted.

(S106-2) The recall size analysis unit 205 refers to the analysis information 207 and retrieve an entry of which the file size range ID 601 and the type ID 602 match the identification information of the range and the identification information of the extension. The recall size analysis unit 205 obtains the value stored the recall size 606 of the retrieved entry. The recall size analysis unit 205 transmits the obtained value to the file system 200. Hereinabove, the processing executed by the recall size analysis unit 205 has been described.

Subsequently, the file system 200 recalls data of the stub file in cooperation with the data mover 202 (step S107) and instructs the log obtaining unit 204 to register the log of the recall (step S108). In step S107, the following processing is executed.

(S107-1) The file system 200 transmits an obtaining request including the identification information, the read range, and the recall size of the read target file to the data mover 202.

(S107-2) The data mover 202 transmits an obtaining request to the archive server 112 on the basis of the obtaining request received from the file system 200 and a prescribed protocol. The data mover 202 transmits the data obtained from the archive server 112 to the file system 200.

(S107-3) The file system 200 transmits the received data to the file sharing unit 201. Hereinabove, the processing of step S107 has been described.

Subsequently, the file sharing unit 201 transmits the data received from the file system 200 to an application (step S111).

The file system 200 holds a reference counter for each file in order to manage a reference state of a file. An initial value of the reference counter is set to 0. The file system 200 adds 1 to the reference counter in a case where a file open process is executed and subtracts 1 from the reference counter in a case where a file close process is executed. In a case where the reference counter is larger than 0, it indicates that the file is referred to by a user.

Figure 8:
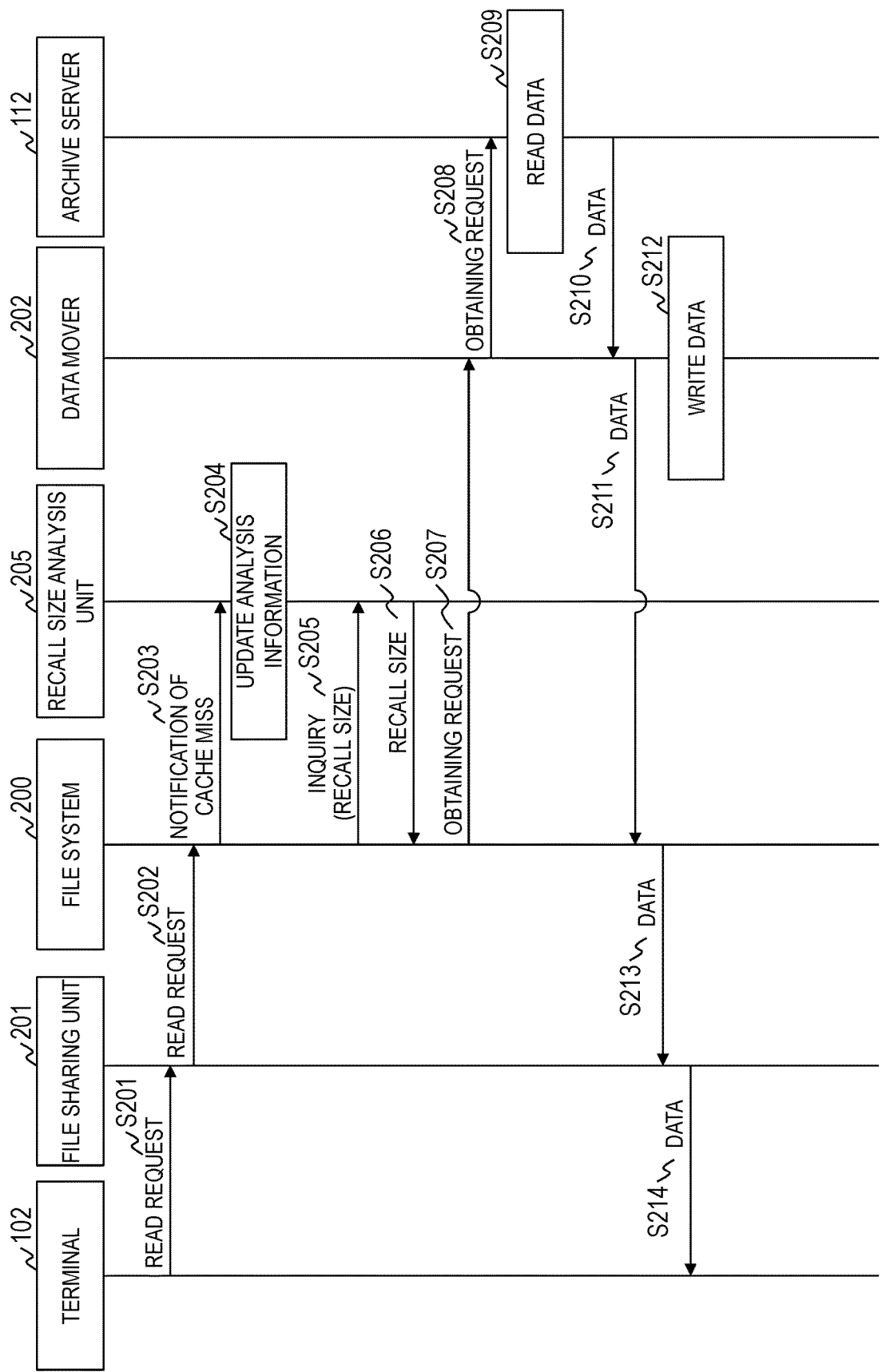
FIG. 8 is a sequence diagram for describing the flow of a read process in the computer system according to Embodiment 1.

FIG. 8 is a sequence diagram for describing the flow of a read process in the computer system according to Embodiment 1. In this example, a read process for reading a stub file will be described.

An application operating on the terminal 102 transmits a read request to the file sharing unit 201 (step S201).

The file sharing unit 201 transmits the read request to the file system 200 (step S202).

In this example, it is assumed that the read target file of the file system 200 is a stub file and the read target of the read range is not present. In this case, the file system 200 notifies the recall size analysis unit 205 of a cache miss (step S203).

The recall size analysis unit 205 updates the analysis information 207 (step S204). The process of step S204 corresponds to the process of step S105.

The file system 200 sends an inquiry of a recall size to the recall size analysis unit 205 (step S205).

The recall size analysis unit 205 notifies the file system 200 of the recall size (step S206).

The file system 200 transmits an obtaining request including the recall size to the data mover 202 (step S207).

The data mover 202 transmits an obtaining request of a prescribed protocol to the archive server 112 (step S208).

The archive server 112 reads data from the LU 311 (step S209). Specifically, the data mover 301 transmits the received obtaining request to the file system 300 and the file system 300 reads the data from the LU 311.

The archive server 112 transmits the read data to the data mover 202 (step S210).

Upon receiving the data from the archive server 112, the data mover 202 transmits the data to the file system 200 (step S211) and writes the data to the LU 211 (step S212). Transmission of data and writing of data are executed asynchronously.

The file system 200 transmits the data received from the data mover 202 to the file sharing unit 201 (step S213) and the file sharing unit 201 transmits the data to the terminal 102 (step S214).

As described above using FIGS. 7 and 8, the data mover 202 recalls the stub file on the basis of the recall size set in the analysis information 207.

Figure 9:
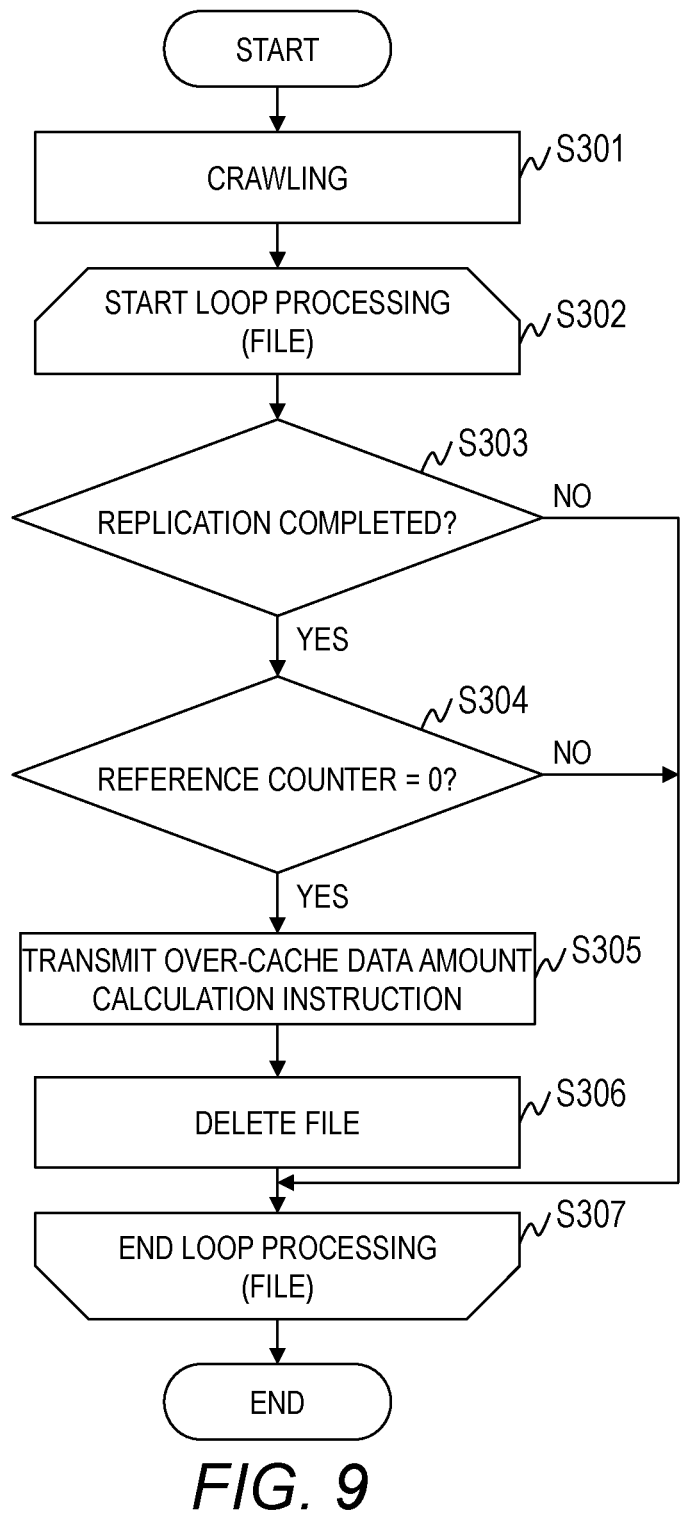
FIG. 9 is a flowchart for describing an example of a stubification process executed by the file server according to Embodiment 1.

FIG. 9 is a flowchart for describing an example of a stubification process executed by the file server 110 according to Embodiment 1.

The stubification processing unit 203 executes the following processing in a case where an execution instruction is received, in a case where prescribed execution conditions are satisfied, or periodically. For example, an auto-execution program may call the stubification processing unit 203.

The stubification processing unit 203 crawls the LU 211 in order to retrieve a stubification target file in cooperation with the file system 200 (step S301). For example, a file of which the entity is present in the LU 211 is specified as a stubification target file.

Subsequently, the stubification processing unit 203 starts loop processing of the stubification target file (step S302). Specifically, the stubification processing unit 203 selects one target file from the specified files.

Subsequently, the stubification processing unit 203 determines whether replication of the target file is completed (step S303).

Specifically, the stubification processing unit 203 asks the data mover 202 whether the target file is stored in the core system 101.

In a case where replication of the target file is not completed, the stubification processing unit 203 proceeds to step S307.

In a case where replication of the target file is completed, the stubification processing unit 203 determines whether the reference counter of the target file is 0 (step S304).

Specifically, the stubification processing unit 203 asks the file system 200 about the reference counter of the target file.

In a case where the reference counter is not 0, the stubification processing unit 203 proceeds to step S307.

In a case where the reference counter is 0, the stubification processing unit 203 transmits an over-cache data amount calculation instruction to the recall size analysis unit 205 (step S305). In this way, the analysis information 207 is updated. The processing executed in a case of receiving the over-cache data amount calculation instruction will be described with reference to FIG. 10.

Subsequently, the stubification processing unit 203 transmits a target file deletion instruction to the file system 200 (step S306). After that, the stubification processing unit 203 proceeds to step S307.

The file system 200 deletes data other than the metadata of the target data from the LU 211.

In step S307, the stubification processing unit 203 determines whether processing has been completed for all files specified in step S301 (step S307).

In a case where processing has not been completed for all files specified in step S301, the stubification processing unit 203 returns to step S302 and executes similar processing.

In a case where processing has been completed for all files specified in step S301, the stubification processing unit 203 ends the processing.

Figure 10:
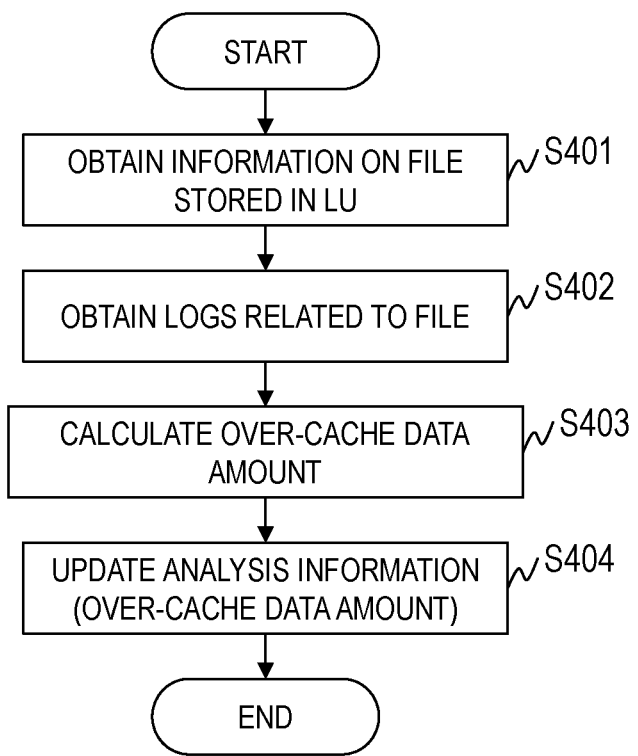
FIG. 10 is a flowchart for describing an example of an over-cache data amount calculation process executed by the file server according to Embodiment 1.

FIG. 10 is a flowchart for describing an example of an over-cache data amount calculation process executed by the file server 110 according to Embodiment 1.

The recall size analysis unit 205 obtains information on the target file stored in the LU 211 from the file system 200 (step S401). For example, an extent map is obtained.

Subsequently, the recall size analysis unit 205 obtains the logs related to the target file from the read log information 206 (step S402).

Specifically, the recall size analysis unit 205 refers to the extension definition information 510 to convert the extension of the target file to the identification information of the extension. The recall size analysis unit 205 refers to the read log information 206 to obtain the entries (logs) of which the identification information of the extension is stored in the type ID 402.

Only logs of which the time stamps are included in the range of time points which are a certain period before the present time point may be obtained.

Subsequently, the recall size analysis unit 205 calculates a data amount of data which is not actually read, as the over-cache data amount on the basis of the information on the target file stored in the LU 211 and the logs (step S403).

For example, the recall size analysis unit 205 calculates the total amount of data read on the basis of the information on the files stored in the LU 211 and calculates the sum of the amounts of data read on the basis of the logs. The recall size analysis unit 205 can calculate the over-cache data amount by subtracting the sum of the amounts of read data from the total amount of data.

In this case, the recall size analysis unit 205 calculates the average of the values of the read size 407 in the log as the read range of the target file. Moreover, the recall size analysis unit 205 refers to the file size range definition information 500 to convert the read range to the identification information of the range.

Subsequently, the recall size analysis unit 205 updates the analysis information 207 on the basis of the calculated over-cache data amount (step S404). After that, the recall size analysis unit 205 ends the over-cache data amount calculation process.

Specifically, the recall size analysis unit 205 retrieves an entry of which the file size range ID 601 and the type ID 602 match the identification information of the range and the identification information of the extension and adds the calculated over-cache data amount to the over-cache data amount 605 of the retrieved entry.

In a case where the entry is not present, the recall size analysis unit 205 adds an entry to the analysis information 207 and sets initial values to the fields of the added entry. An initial value setting method is the same as S109-4. The recall size analysis unit 205 adds the calculated over-cache data amount to the over-cache data amount 605 of the added entry.

Figure 11:
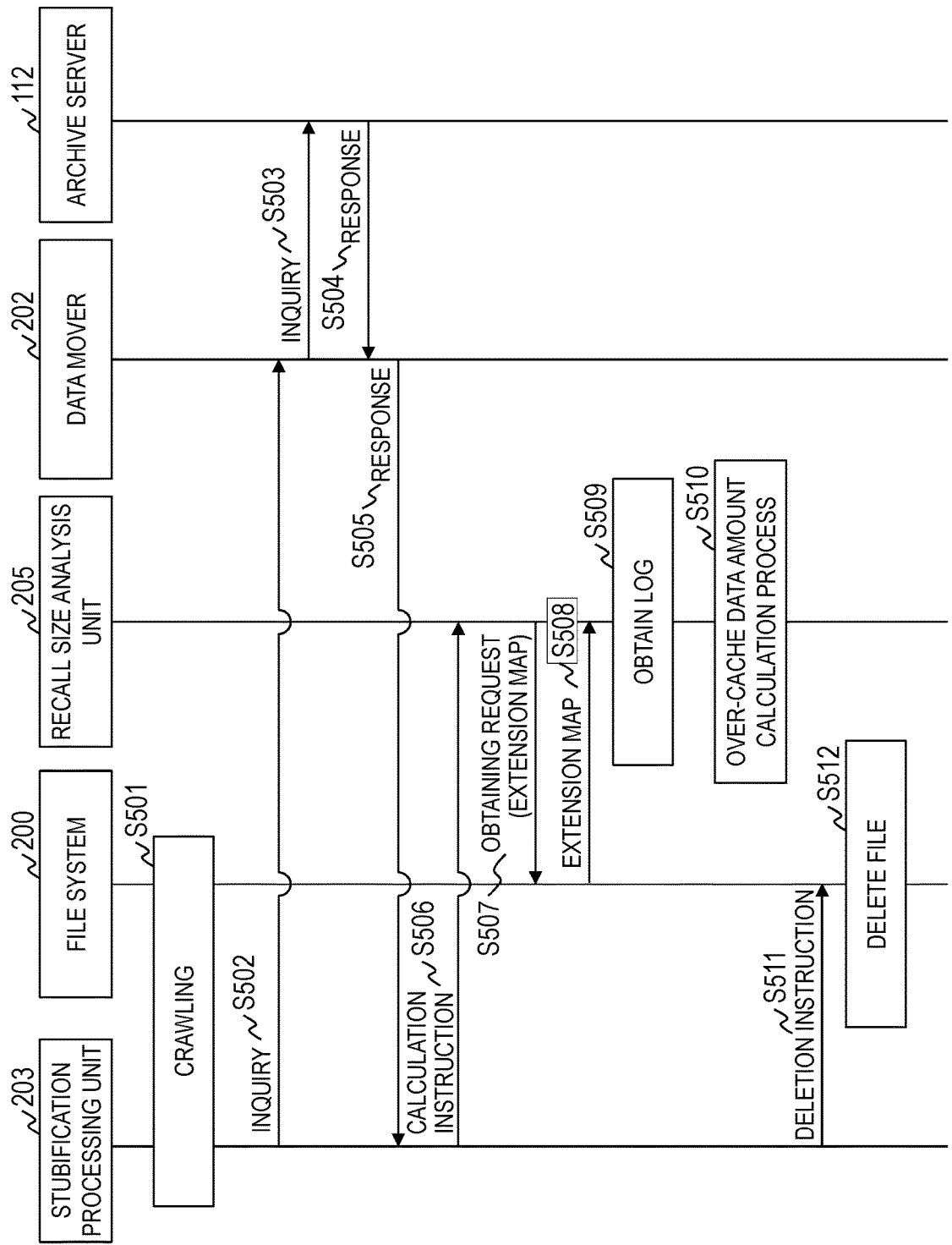
FIG. 11 is a sequence diagram for describing the flow of a stubification process in the computer system according to Embodiment 1.

FIG. 11 is a sequence diagram for describing the flow of a stubification process in the computer system according to Embodiment 1.

The stubification processing unit 203 crawls the LU 211 in cooperation with the file system 200 (step S501).

The stubification processing unit 203 asks the data mover 202 whether replication of the target file is completed (step S502).

The data mover 202 asks the archive server 112 whether the target file is stored (step S503).

The archive server 112 transmits a response including information indicating the presence of the target file to the data mover 202 (step S504).

The data mover 202 transmits the received response to the stubification processing unit 203 (step S505). In this example, it is assumed that replication of the target file is completed. Moreover, the reference counter is 0.

The stubification processing unit 203 transmits an over-cache data amount calculation instruction to the recall size analysis unit 205 (step S506).

The recall size analysis unit 205 transmits an obtaining request for the information on the target file stored in the LU 211 to the file system 200 (step S507).

The file system 200 transmits the information on the target file stored in the LU 211 to the recall size analysis unit 205 (step S508).

The recall size analysis unit 205 obtains the logs related to the target file from the read log information 206 (step S509).

The recall size analysis unit 205 executes an over-cache data amount calculation process for calculating the over-cache data amount of the target file (step S510).

The stubification processing unit 203 transmits a target file deletion instruction to the file system 200 (step S511).

The file system 200 deletes the target file from the LU 211 (step S512).

Figure 12:
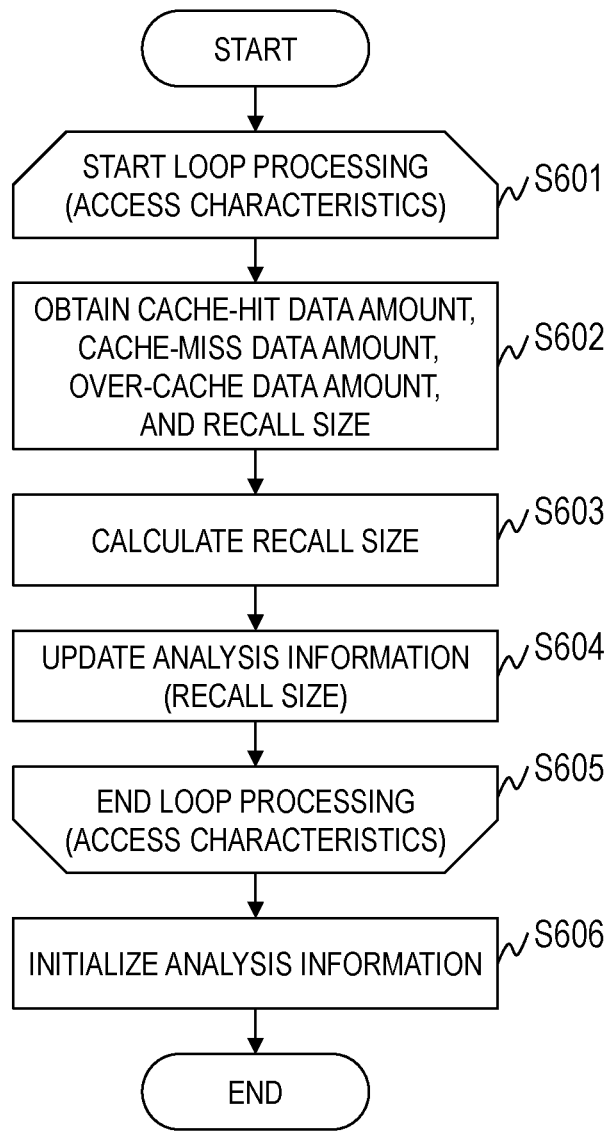
FIG. 12 is a flowchart for describing an example of a recall size updating process executed by the file server according to Embodiment 1.

FIG. 12 is a flowchart for describing an example of a recall size updating process executed by the file server 110 according to Embodiment 1.

The recall size analysis unit 205 executes the following processing in a case where an execution instruction is received, in a case where prescribed execution conditions are satisfied, or periodically. For example, an auto-execution program may call the recall size analysis unit 205.

The recall size analysis unit 205 starts loop processing of the access characteristics (step S601).

Specifically, the recall size analysis unit 205 selects a target entry among the entries of the analysis information 207.

Subsequently, the recall size analysis unit 205 obtains a cache-hit data amount, a cache-miss data amount, an over-cache data amount, and a present recall size from the target entry (step S602).

Subsequently, the recall size analysis unit 205 calculates a new recall size using the cache-hit data amount, the cache-miss data amount, the over-cache data amount, and the present recall size (step S603). For example, the new recall size is calculated using the following algorithm.

(S603-1) The recall size analysis unit 205 calculates StepSize($\alpha$) illustrated in Equation (1). In this equation, S represents a cache-hit data amount, U represents a cache-miss data amount, and D represents an over-cache data amount. Moreover, a represents a positive constant. $\alpha$ can be set arbitrarily.

[Equation 1]

$$StepSize(\alpha) = \begin{cases} \alpha & \text{if } (S - U - D) > 0 \\ 0 & \text{if } (S - U - D) = 0 \\ -\alpha & \text{if } (S - U - D) < 0 \end{cases} \quad (1)$$

(S603-2) The recall size analysis unit 205 calculates a new recall size using Equation (2). In this equation, R(N) represents a present recall size and R(N+1) represents a new recall size.

[Equation. 2]

$$R(N+1) = R(N) + StepSize(\alpha) \quad (2)$$

The above-described algorithm is an example and there is not limited thereto.

Subsequently, the recall size analysis unit 205 updates the analysis information 207 by registering the new recall size in the target entry (step S604).

Specifically, the new recall size is overwritten to the recall size 606 of the target entry.

Subsequently, the recall size analysis unit 205 determines whether processing has been completed for all access characteristics (step S605). That is, it is determined whether processing has been completed for all entries of the analysis information 207.

In a case where processing has not been completed for all access characteristics, the recall size analysis unit 205 returns to step S601 and executes similar processing.

In a case where processing has been completed for all access characteristics, the recall size analysis unit 205 initializes the analysis information 207 (step S606) and ends the recall size updating process.

Specifically, the recall size analysis unit 205 initializes the cache-hit data amount 603, the cache-miss data amount 604, and the over-cache data amount 605 of all entries of the analysis information 207.

The recall size updating process will be described using a specific example.

It will be assumed that the present recall size is 1024 Kbyte and such logs as illustrated in FIG. 4 are stored in the read log information 206. Moreover, $\alpha$ is 128 Kbyte.

In this case, a total data amount of the files of the LU 211 is 3072 Kbyte, the cache-hit data amount is 1408 Kbyte, the cache-miss data amount is 640 Kbyte, and the over-cache data amount is 1024 Kbyte.

A calculation result of Equation (1) is −128 Kbyte. Therefore, the new recall size is updated to 896 Kbyte.

In a case where the recall size is 896 Kbyte and such processing as illustrated in FIG. 4 is executed, the read log information 206 is as illustrated in FIG. 13.

In this case, the total data amount of the files of the LU 211 is 2688 Kbyte, the cache-hit data amount is 1536 Kbyte, the cache-miss data amount is 512 Kbyte, and the over-cache data amount is 640 Kbyte.

From the above, the present invention has the following advantages.

(1) The total data amount of the files of the LU 211 can be reduced. That is, the data amount of the recalled data can be reduced. That is, the data amount of data transmitted and received between the edge system 100 and the core system 101 can be reduced. In this way, the amount of a communication band used between the edge system 100 and the core system 101 can be reduced.

(2) The over-cache data amount can be reduced. In this way, the use amount of the storage system 111 of the edge system 100 can be reduced.

(3) A cache hit ratio is improved. In this way, a file access performance is improved.

The present invention is not limited to data of a file format. The present invention can be applied to data of various data formats.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising:
   at least one computer, the at least one computer including an arithmetic device, a storage device coupled to the arithmetic device, and a connection interface coupled to the arithmetic device, the computer system managing data and being coupled to a local storage system and a remote storage system,
   the at least one computer is configured to:
   execute writing and reading of the data to and from a terminal coupled to the computer system;
   execute writing and reading of the data to and from the local storage system and the remote storage system; and
   obtain IOU related to data read requests including data read requests of stub files:
   store, in a memory:
      definition information indicating previously defined file size range identifications (IDs) for a plurality of ranges of respective file size ranges and indicating a plurality of extension type IDs of respective file extensions,
      read request log data of the logs related to data read requests including a plurality of entries for respective read requests, each entry indicating at least the extension type ID, size, offset indicating a starting point of a data read range of a read target file, and a read size, and
      analysis information for managing results of analysis using the read log information including a plurality of entries, each entry indicating at least a file size range ID, extension type ID, and a recall size,
   receive a read request of target data and determine that the target data is data of a stub file that is not stored in the local storage system, the read request including a file size, file extension type, a first read amount of data and an offset,
   convert the offset in the read request to a first size range ID which is one of the file size range IDs based on the definition information and convert the file extension type in the read request to a first extension type ID which is one of the extension type IDs based on the definition information,
   use a combination of the first extension type ID and the first size range ID as access characteristics to analyze the analysis information to determine an entry of the plurality of entries of the analysis information matching the first extension type ID and the first size range ID and determine the recall size of the target data from the entry that matches,
   send a request to the remote storage system that includes the first extension type ID, the first size range ID, the offset, and the determined recall size of the read target file, and
   receive the data of the target data from the remote storage system and store the received target data in the local storage system,
   wherein the at least one computer is further configured to:
   analyze the target access characteristics to calculate a first data amount, a second data amount, and a third data amount, the first data amount indicates a difference between a second read amount of the data corresponding to the target access characteristics obtained from the remote storage system and the first read amount of the data corresponding to the target access characteristics of the read request by the terminal, the second data amount indicates a volume of the data corresponding to the target access characteristics stored in the local storage system in a case of receiving the read request, and a third data amount indicates a volume of the data corresponding to the target access characteristics, which was not stored in the local storage system in a case of receiving the read request; and
   determine the recall size of the target access characteristics on the basis of the first data amount, the second data amount, and the third data amount.

2. An access control method being executed by a computer system including at least one computer, the at least one computer managing data and including an arithmetic device, a storage device coupled to the arithmetic device, and a connection interface coupled to the arithmetic device, the computer system being coupled to a local storage system and a remote storage system, the access control method comprising:
   executing writing and reading of the data to and from a terminal coupled to the computer system;
   executing writing and reading of the data to and from the local storage system and the remote storage system;
   obtaining logs related to data read requests including data read requests of stub files:
   storing, in a memory:
      definition information indicating previously defined file size range identifications (IDs) for a plurality of ranges of respective file size ranges and indicating a plurality of extension type IDs of respective file extensions,
      read request log data of the logs related to data read requests including a plurality of entries for respective read requests, each entry indicating at least the extension type ID, size, offset indicating a starting point of a data read range of a read target file, and a read size,
      analysis information for managing results of analysis using the read log information including a plurality of entries, each entry indicating at least a file size range ID, extension type ID, and a recall size, receiving a read request of target data and determine that the target data is data of a stub file that is not stored in the local storage system, the read request including a file size, file extension type, read amount of data and an offset;

converting the offset in the read request to a first size range ID which is one of the file size range IDs based on the definition information and convert the file extension type in the read request to a first extension type ID which is one of the extension type IDs based on the definition information;

using a combination of the first extension type ID and the first size range ID as access characteristics to analyze the analysis information to determine an entry of the plurality of entries of the analysis information matching the first extension type ID and the first size range ID and determine the recall size of the target data from the entry that matches, analyzing, the target access characteristics to calculate a first data amount, a second data amount, and a third data amount, the first data amount indicates a difference between a read amount of the data corresponding to the target access characteristics obtained from the remote storage system and a read amount of the data corresponding to the target access characteristics by the terminal, the second data amount indicates a volume of the data corresponding to the target access characteristics stored in the local storage system in a case where the read request was received, and the third data amount indicates a volume of the data corresponding to the target access characteristics, which was not stored in the local storage system in a case where the read request was received, determining the recall size of the target access characteristics on the basis of the first data amount, the second data amount, and the third data amount, send sending a request to the remote storage system that includes the first extension type ID, the first size range ID, the offset, and the determined recall size of the read target file, and receive receiving the data of the target data from the remote storage system and store the received target data in the local storage system.

\* \* \* \* \*